Jan. 2, 1973 S. MALINOW ET AL 3,708,312
POULTRY PRODUCT AND METHOD
Filed Feb. 8, 1971 2 Sheets-Sheet 1

INVENTOR
SIDNEY MALINOW
JOSEPH B. CRAINE
BY E. V. McCabe
ATT'Y

United States Patent Office 3,708,312
Patented Jan. 2, 1973

3,708,312
POULTRY PRODUCT AND METHOD
Sidney Malinow, 7830 W. 97th Place, Hickory Hills, Ill. 60457, and Joseph B. Craine, 7734 Palatine Ave., Chicago, Ill. 60614
Filed Feb. 8, 1971, Ser. No. 113,347
Int. Cl. A22c 21/00; A23b 1/06
U.S. Cl. 99—194          12 Claims

ABSTRACT OF THE DISCLOSURE

The posterior opening of an eviscerated fowl is held open by a tubular device comprising a pair of telescoped members, through which stuffing may be introduced, and in which giblets or other items may be carried.

---

Generally, the present invention relates to an improvement in the art of poultry packaging, and more specifically, to a technique for packaging frozen poultry in a manner which will permit stuffing without the necessity of defrosting. This invention is an improvement on the disclosure of copending application S.N. 871,394 filed Aug. 11, 1969 now Pat. No. 3,623,892, issued Nov. 30, 1971 which is a continuation of S.N. 602,709, now abandoned, filed Dec. 19, 1966.

In this era of modern packaging and convenience foods, the frozen fowl is almost unique in the time required for its preparation for it requires substantial time for thawing in addition to cooking. Consequently frozen turkeys, for example, are sold in greatest quantities for special occasions such as holidays. The main objection to frozen fowl preparation is the thawing time required prior to cooking to render the flesh sufficiently flaccid for removal of the neck and/or giblets normally packaged within a body cavity of the frozen eviscerated fowl. These parts must be removed from the body cavity to permit the insertion of stuffing therein and indeed some consumers may wish to use the giblets in preparing the stuffing or a giblet gravy. But the usual frozen fowl has the body cavity openings frozen closed, and the parts are usually adhered to the cavity wall; and heretofore it has been necessary to thaw the carcass to gain access to the cavity and to remove the giblets. (Herein it will be understood the term giblets may be construed as including the neck.) It will also be recognized that the thawing requirement is not without certain hazards and other disadvantages as it contributes to product deterioration and bacterial growth.

It is accordingly an object of the present invention to provide an improved package of food items to be associated with frozen poultry.

It is another object of the present invention to provide a packaged frozen fowl having a dilated cavity opening through which giblets and/or neck can be removed and stuffing inserted without the necessity of thawing the fowl.

It is still another object of the present invention to provide an improved method and means for removably packaging giblets and/or other food materials within a frozen fowl and maintaining the posterior opening thereof dilated while frozen.

Other objects of the present invention, if not specifically set forth herein, will be readily apparent to one skilled in the art from a reading of the following specification and claims.

The present invention is illustrated by way of example in the accompanying drawings in which.

Figure 1:
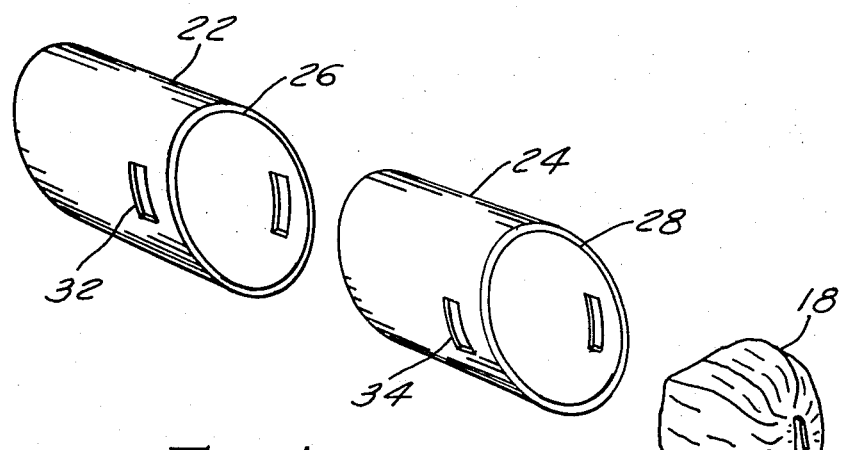
FIG. 1 is an exploded view of a preferred embodiment according to the present invention.
Figure 2:
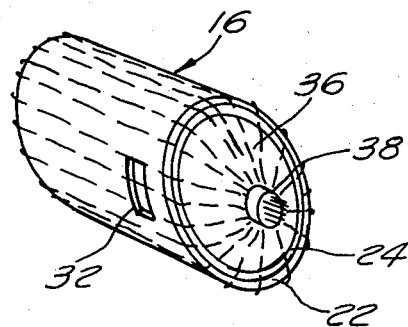
FIG. 2 is a perspective view of the embodiment shown in FIG. 1 assembled together and overwrapped with film.

In the embodiment of the invention illustrated by the figures an eviscerated fowl 10 with a cleaned body cavity 12 has a posterior opening 14 maintained dilated by a tubular device generally 16 inserted therein. The tubular device generally 16 is of a relatively short length sufficient to retain its position once inserted in the posterior opening of the fowl at the packinghouse but of sufficient length and diameter to contain a bag of food items placed therein, such as a bag 18 containing food such as giblets comprising one or more of the neck and organs. The diameter of the tubular device should also be sufficient to facilitate access to the interior cavity through the posterior opening in which it is inserted. It will be observed from FIG. 3 that the tubular device 16 need extend only partially into the fowl cavity, and it is not required to run the length thereof thereof, although it may do so if desired. Preferably a cook should be enabled to fill the cavity with stuffing while the tubular member, or a portion thereof, remains in place.

The present improved form of the invention contemplates a two part tubular device having at least one tapered or bias cut end to generally conform to the contour of the outer surface of the fowl in the area around the posterior opening. Hence this invention comprises a first outer member 22 and a second inner member 24, the latter having an outside diameter slightly less than inside diameter of the former, each of which has tapered forward ends 26, 28, respectively. Normally the outer member 22 may be about 2 to 4 inches in outside diameter and about 5 to 10 inches long. The angle of the tapered surfaces should be such as to allow the ends 26, 28 to lay substantially congruent with the contours of the fowl 10 and it will usually be found that the ends may be cut at an angle of between 45° and 75° with the longitudinal axis of the members. Preferably members 22 and 24 are cylindrical, but it is also possible to utilize tubular members that are of conical configuration such as truncated cones, and the like.

The rear ends of the tubular members 22, 24, may be similarly tapered parallel with ends 26, 28 and indeed this will facilitate cutting of the members successively from cylindrical stock. However, the rear ends of the members may be cut normal to the axis if desired. Tubular members 22, 24, may also be of equal or substantially equal length, however, the advantages of the invention may be obtained where the inner member 24 is either longer or shorter than outer member 22. For instance the outer member 22 may be quite short so as to engage and keep open the posterior opening 14 of the fowl, and the inner member 24 extend fully into the cavity 12.

Preferably each of the members 22, 24 contains pairs of opposing slots 32, 34, respectively, or is otherwise keyed to receive lever means, adjacent the tapered ends 26, 28. In the preferred form illustrated the slots 32, 34 are sized to receive the blade of a table knife inserted across one or both members. A lever, such as a table knife, may thus be inserted and used to pull and/or twist the members 22, 24 from the body of the fowl 10.

It is intended that the inner member 24 be telescoped within outer member 22 in an attitude so that the respective tapered ends 28, 26 thereof are oriented in the same direction and parallel to one another. Usually the two tapered ends 26, 28 will be flush with one another, however it is within the the intent of this invention that the end 28 of the inner member 24 may extend outwardly a short distance from member 22 so as to fully expose the slots 34. The latter configuration will facilitate removal of the inner member 24 while leaving the outer member 22 in place for stuffing of the fowl 10.

The tubular device generally 16 is intended in most circumstances to contain food items such as giblets and the like, but may also contain preformulated gravies and sauces, etc. To prevent the latter from slipping further into the body cavity 12 of the fowl 10, it is possible to close the inside or both ends of only the inner tube member 24; however, it is preferred to envelop the entire assembled tubular device generally 16 with a wrapper 36, such as plastic film, which is also securely closed as by a fastener clip 38. Advantageously the wrapper 36 may be of a heat shrinkable material such as polyethylene, polyester, and polyvinyl chloride. It is also preferred to first fill the food items in a pouch 18 which is placed within the inner member 24.

In practice the present method is performed upon an unfrozen fowl carcass 10 which has been eviscerated. The previously described members 22, 24 are assembled in telescoped configuration and the giblets assigned to the carcass are placed in a pouch 18 and deposited within the inner member 24. Thereafter the members 22, 24 and pouch 18 are preferably enveloped in the wrapper 36 which is fastened by a clip 38 or the like (and shrunk if the wrapper 36 is a shrinkable material). The entire tubular device generally 16, which is in effect a giblet package, is then inserted through the flaccid flesh at the posterior incision 14 of the fowl 10 and carefully oriented so that the tapered ends 26, 28 are contoured with the conformation of the carcass and extended just slightly outside the carcass so as to be available for extraction by the consumer. Thereafter the entire carcass with tubular device generally 16 in place may be overwrapped or bagged in a film 40. The fowl 10 is then frozen and packed for shipping or the like.

Figure 3:
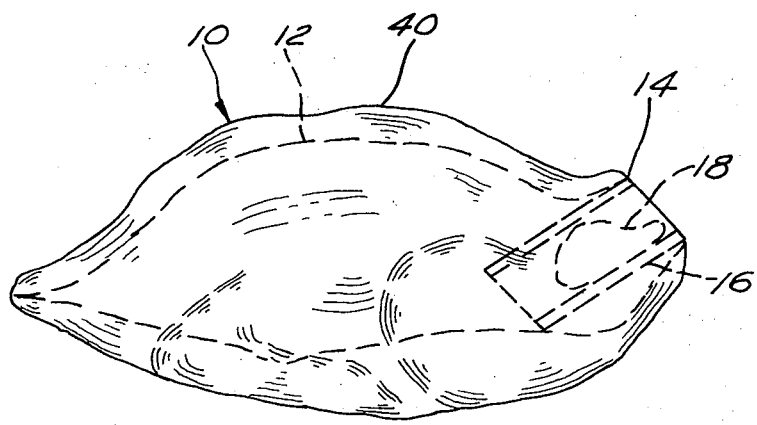
FIG. 3 is a profile view of fowl carcass containing the embodiment shown in FIGS. 1 and 2.

When preparing the fowl illustrated in FIG. 3, the cook first removes the bag or overwrap 40 from the carcass and then extracts the giblet pouch 18 from the tubular device generally 16. This is usually accomplished by first withdrawing the inner member 24 and then extracting the pouch 18 therefrom. If the tubular device is enveloped in a wrapper 36 it is first necessary to tear the latter open so as to expose the inner member 24. A lever, such as a knife blade, may be inserted into one or both of the slots 34 to facilitate withdrawal by twisting and/or pulling the inner member 24 from the outer member 22. If no wrapper 36 is present the carcass may be further prepared and while frozen stuffed and then cooked with the outer member 22 remaining within the posterior opening 14.

It is usually necessary, however, to remove both tubular members 22 and 24 from the frozen carcass so as to also remove the entire tube wrapper 36. For this purpose the lever slot pairs 32, 34 are of greatest advantage as they permit use of a lever to overcome the tendency of the outer member 22 and wrapper to become bound in the frozen flesh. In this case the two tubular members may be removed together, as the slot pairs 32, 34 should be aligned when the tapered ends 26, 28 are properly oriented as above described. However, it is also possible to remove the tubular member separately. The tube wrapper 36 should also be removed and may require some slight thawing by inserting a warmed cloth or the like.

Several further options are also available to the cook. For instance the frozen fowl 10 may be stuffed through the posterior opening 14 after both members 22, 24 have been removed and the opening 14 will retain its dilated form while the flesh remains frozen. The outer member 22 may be reinserted to further facilitate the stuffing operation. If a rapid cooking of the carcass is desired and large amounts of stuffing are not required, the cook may wish to replace the outer member 22 and commence cooking of the fowl immediately. In the latter instance the tubular members will maintain the opening 14 dilated throughout cooking, even after the flesh thaws, thus permitting the heated cooking gases and vapors to enter the body cavity 12 and hasten cooking of the fowl from the inside. Also, should the cook prefer to completely thaw the carcass before commencing the cooking steps, the retention of the outer member 22 in the posterior opening 14 will facilitate and hasten thawing by allowing the interior of the carcass to be warmed.

Various materials may be used in preparing the tubular members, the only criteria being that any part to be retained in the carcass during cooking will withstand the cooking temperatures without deformation and that the flesh of the fowl will not be adversely affected by the material used in making the tubular members. Material such as paper, tin, aluminum, stainless steel, polypropylene, and various other plastics which will withstand normal cooking temperatures of 350–450° are suitable for this purpose.

Although the foregoing description has been primarily in relation to the treatment of turkeys, it will be apparent that the invention is also applicable to other fowl, such as chickens, ducks, geese, etc.

While the present invention has been described in reference to specific embodiments, it will be obvious to one skilled in the art that many modifications and variations of the invention as hereinbefore set forth may be made without departing from the spirit and scope thereof and, therefore, only such limitations should be imposed as are indicated in the appended claims.

We claim:

1. An improved method for packaging food items which are associated with the preparation of a poultry carcass, poultry, said method comprising: placing the items within the innermost cylinder of a pair of telescoped tubular members; and inserting said pair of telescoped tubular members within the posterior opening of an eviscerated poultry carcass.

2. The method of claim 1 including the step of enveloping the telescoped tubular members with an outer wrapper.

3. The method of claim 1 wherein the items are first filled into a pouch which is then placed within the innermost tubular member.

4. The method of claim 1 wherein the telescoped members are tapered at least at one end, and including the steps of inserting the telescoped members within the posterior opening of a poultry carcass so as to extend within the body cavity thereof; and orienting the tapered end of the members to be disposed outwardly of the carcass and to generally follow the contour thereof.

5. The method of claim 4 including the steps of overwrapping the carcass with tubular members inserted therein, and freezing the carcass.

6. An improved package for food items which are associated with the preparation of a poultry carcass, poultry, said package comprising: an outer tubular member; an inner tubular member telescoped within said outer member, and an end of each of said tubular members being tapered at an angle to the axis thereof; and at least one food item contained within a pouch positioned within said inner member, said package being positioned in the posterior opening of an eviscerated poultry carcass.

7. The package of claim 6 including an enveloping wrapper fastened about the exterior of said telescoped inner and outer tubular members.

8. The package of claim 6 wherein an end of each member contains slots for removing said package from the poultry carcass.

9. The package of claim 6 wherein the tapered end of each member contains slots for removing said package from the poultry carcass, and said slots in each of said members are aligned with each other.

10. The package of claim 9 wherein the telescoped tubular members are inserted in the posterior opening of a poultry carcass so as to extend within the body cavity thereof and the members are oriented with said tapered ends disposed outwardly of the carcass and substantially congruent with the contours of the carcass.

11. The package of claim 10 including an enveloping wrapper fastened about the exterior of said telescoped members.

12. The package of claim 10 wherein the poultry carcass and tubular members inserted therein are enclosed within an overwrap.

References Cited

UNITED STATES PATENTS

| | | | |
|---|---|---|---|
| 3,102,465 | 9/1963 | Montesano | 206—.5 X |
| 3,105,592 | 10/1963 | Cohen | 220—8 X |
| 3,623,892 | 11/1971 | Koonz et al. | 99—194 |

HYMAN LORD, Primary Examiner

U.S. Cl. X.R.

99—107, 174

PO-1050
(5/69)

UNITED STATES PATENT OFFICE
CERTIFICATE OF CORRECTION

Patent No. 3,708,312              Dated January 2, 1973

Inventor(s) SIDNEY MALINOW and JOSEPH B. CRAINE

It is certified that error appears in the above-identified patent and that said Letters Patent are hereby corrected as shown below:

The patent should show on its face that it is assigned to Swift & Company of Chicago, Illinois.

Column 2, line 21 - cancel second "thereof";

Column 4, line 58 - after and, cancel "an".

Signed and sealed this 13th day of November 1973.

(SEAL)
Attest:

EDWARD M. FLETCHER, JR.            RENE D. TEGTMEYER
Attesting Officer                     Acting Commissioner of Patents